(12) United States Patent
Hoffmann et al.

(10) Patent No.: US 8,907,039 B2
(45) Date of Patent: Dec. 9, 2014

(54) METHOD FOR PREPARING (HYDROXYMETHYL)POLYSILOXANES

(75) Inventors: Florian Hoffmann, Munich (DE); Juergen Stohrer, Pullach (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 14/237,535

(22) PCT Filed: Jul. 18, 2012

(86) PCT No.: PCT/EP2012/064055
§ 371 (c)(1),
(2), (4) Date: Feb. 8, 2014

(87) PCT Pub. No.: WO2013/023863
PCT Pub. Date: Feb. 21, 2013

(65) Prior Publication Data
US 2014/0187731 A1    Jul. 3, 2014

(30) Foreign Application Priority Data

Aug. 12, 2011   (DE) .................. 10 2011 080 900

(51) Int. Cl.
C08G 77/14    (2006.01)
C08G 77/04    (2006.01)
C08G 77/10    (2006.01)

(52) U.S. Cl.
CPC ............... *C08G 77/04* (2013.01); *C08G 77/14* (2013.01); *C08G 77/10* (2013.01)
USPC .............................................. 528/37; 528/34

(58) Field of Classification Search
None
See application file for complete search history.

(56) References Cited

U.S. PATENT DOCUMENTS

| | | | |
|---|---|---|---|
| 2,837,550 A | 6/1958 | Prober | |
| 3,324,161 A | 6/1967 | Simmler | |
| 3,446,830 A | 5/1969 | Niederprum et al. | |
| 3,481,963 A | 12/1969 | Simmler | |
| 3,879,433 A | 4/1975 | Omietanski et al. | |
| 5,371,262 A | 12/1994 | Arkles | |
| 6,943,265 B2 * | 9/2005 | Schafer et al. | 556/443 |
| 2004/0073031 A1 | 4/2004 | Schaefer et al. | |
| 2012/0220793 A1 | 8/2012 | Daiss et al. | |
| 2013/0018200 A1 | 1/2013 | Daiss et al. | |

FOREIGN PATENT DOCUMENTS

| | | |
|---|---|---|
| DE | 879 839 | 6/1953 |
| DE | 1213406 | 3/1966 |
| DE | 1 227 456 A1 | 10/1966 |
| DE | 1 233 395 | 2/1967 |
| DE | 1 236 505 | 3/1967 |
| DE | 44 07 437 A1 | 9/1994 |
| DE | 101 09 842 A1 | 10/2002 |
| DE | 10 2009 046 254 A1 | 5/2011 |
| DE | 10 2010 003 108 A1 | 9/2011 |
| GB | 1 121 265 | 7/1968 |

* cited by examiner

*Primary Examiner* — Marc Zimmer
(74) *Attorney, Agent, or Firm* — Brooks Kushman P.C.

(57) ABSTRACT

Lateral hydroxymethyl-substituted organopolysiloxanol are prepared by reacting a silanol-stopped organosiloxane with a hydrolyzable methyleneoxy-group-containing organosilicon compound.

1 Claim, No Drawings

METHOD FOR PREPARING (HYDROXYMETHYL)POLYSILOXANES

CROSS-REFERENCE TO RELATED APPLICATIONS

This application is the U.S. National Phase of PCT Appln. No. PCT/EP2012/064055 filed Jul. 18, 2012, which claims priority to German application DE 10 2011 080 900.7 filed Aug. 12, 2011, the disclosures of which are incorporated in their entirety by reference herein.

BACKGROUND OF THE INVENTION

1. Field of the Invention

The present invention relates to a method for preparing (hydroxymethyl)polysiloxanes having lateral hydroxymethyl groups and (hydroxymethyl)polysiloxanes having lateral and terminal hydroxymethyl groups.

2. Description of the Related Art (Hydroxyalkyl)polysiloxanes, including (hydroxyalkyl)polysiloxane resins, incorporate as structural element units of the formula (siloxane-O)$_{1+x}$SiR$^i_{2-x}$—R$^{ii}$—OH, where R$^i$ is an alkyl or an aryl residue, generally a methyl residue, R$^{ii}$ is a hydrocarbon residue, which may comprise or be substituted with heteroatoms, and which is attached to the silicon atom in the group SiR$^i_{2-x}$ via a carbon atom, and x=0, 1 or 2.

"Heteroatom" is understood below to mean every atom except carbon and hydrogen, in particular nitrogen, oxygen, halogen, silicon, phosphorus and sulfur.

When x=0, corresponding to the structural element (siloxane-O)SiR$^i_2$—R$^{ii}$—OH, these are polysiloxanes or polysiloxane resins with terminal hydroxyalkyl groups. If x=1 or 2, corresponding to the structural elements (siloxane-O)$_2$SiR$^i$—R$^{ii}$—OH or (siloxane-O)$_3$Si—R$^{ii}$—OH, these are polysiloxanes or polysiloxane resins with lateral hydroxyalkyl groups.

The number of terminal hydroxyalkyl groups in a polysiloxane molecule is limited by the number of end groups in the molecule. The number of lateral hydroxyalkyl groups in a polysiloxane molecule, in contrast, is limited only by the number of monomer units of which the molecule is composed. For example, a linear polysiloxane molecule with ten-membered chains and two end groups can bear at most only two terminal hydroxyalkyl groups, but can bear between one up to a maximum of ten lateral hydroxyalkyl groups. Compared to terminal hydroxyalkyl groups, lateral hydroxyalkyl groups therefore enable a considerably more flexible and precisely adjustable functionalization of polysiloxanes.

The presence of R$^{ii}$ between the silicon atom and the depicted OH group has the effect that the bond attaching the OH group to the siloxane skeleton is stable to hydrolysis. If the OH group is reacted with other compounds, e.g. in polyaddition reactions with, for example, isocyanates or in polycondensation reactions with, for example, carboxylic acids, the bond attaching the resulting products to the siloxane skeleton will likewise be stable to hydrolysis.

The group R$^{ii}$ is in effect a structure-conferring factor, which co-determines not only the properties of the (hydroxyalkyl)polysiloxane but also the properties of the conversion products, which are prepared by using the (hydroxyalkyl)polysiloxane. It is especially both the mobility of R$^{ii}$ and the organic character of R$^{ii}$ which influence these properties (e.g. hardness or flammability). If, for example, the mobility of R$^{ii}$ and/or the organic character of a (hydroxyalkyl)polysiloxane or the conversion product thereof are to be kept to a minimum, the smallest possible R$^{ii}$ residues are ideal, and the choice of R$^{ii}$ as CH$_2$ is particularly advantageous. A further advantage of this choice for R$^{ii}$ is that small structural units mean lower reaction volumes for the same amount of substance with R$^{ii}$-attached OH groups and hence enhanced space-time yields both in the preparation of (hydroxyalkyl)polysiloxanes and of conversion products thereof. The CH$_2$ group is, in this respect, the most efficient solution.

(Hydroxyalkyl)polysiloxanes, where R$^{ii}$ is equal to CH$_2$, are known in the (hydroxymethyl)polysiloxanes below.

Methods for preparing (hydroxyalkyl)polysiloxanes are documented in the literature. Many methods, however, principally provide only hydroxyalkyl chains having at least two carbon atoms. U.S. Pat. No. 3,879,433, for example, describes the preparation of lateral hydroxyalkyl siloxanes by hydrosilylation of hydroxyolefins. However, only hydroxyalkyl groups having at least three carbon atoms are accessible in this manner. Only few methods are suitable for preparing (hydroxymethyl)polysiloxanes. In most cases, these are methods for preparing terminal (hydroxymethyl)polysiloxanes. However, the preparation of lateral (hydroxymethyl)polysiloxanes has also been described.

The preparation of siloxanes having lateral hydroxymethyl groups is possible by reaction of the corresponding chloromethylsiloxanes with magnesium metal, oxidation of the corresponding Grignard compound with oxygen and hydrolysis of the resulting magnesium alkoxide (U.S. Pat. No. 2,837,550). The method is expensive due to the magnesium metal required. The oxidation reaction is strongly exothermic and therefore difficult to manage on an industrial scale and not without hazard. Moreover, the lateral siloxane is only formed in low yield. Lateral hydroxymethyl groups in siloxanes are also accessible by the acid-catalysed alcoholysis of the corresponding (acyloxy)methylsiloxanes (e.g. DE 879839) or (acyloxy)methylsilanes (e.g. DE 1236505), in the latter case combined with co-hydrolysis and co-condensation with further silanes. Under these conditions, however, rearrangements of the siloxane skeleton and etherification of the hydroxymethyl groups also occur.

Additional methods for terminal hydroxymethyl groups in siloxanes have been described:
- DE 879839: acid- or base-catalyzed equilibration of 1,3-bis(acyloxymethyl)tetramethyldisiloxane with further silanes with simultaneous alcoholytic ester cleavage,
- DE 1213406: hydroxylation of bromomethylsiloxanes with metal hydroxides,
- DE 1227456: acid-catalyzed equilibration of 1,3-bis(hydroxymethyl)tetramethyldisiloxane with further silanes,
- DE 1233395: reductive cleavage of (acyloxy)methylsiloxanes with boronates in the presence of boron trifluoride.

A common aspect of these methods is that, under the conditions described, rearrangements of the siloxane skeleton occur, particularly in the equilibration methods. Furthermore, in the case of acid-catalysis, an etherification of the hydroxymethyl groups can also occur. Moreover, boronates are costly and hazardous reagents.

Common to the methods described to date for preparing (hydroxymethyl)polysiloxanes is that, under the reaction conditions, slight rearrangements of the siloxane skeleton occur such that the methods do not result in defined products. Furthermore, the liberation of the ≡SiCH$_2$OH groups from the corresponding precursor compounds (e.g. ≡SiCH$_2$—Oacyl or ≡SiCH$_2$-halogen) frequently does not proceed quantitatively and/or the corresponding ≡SiCH$_2$OH groups react further under the reaction conditions (e.g. with HCl to ≡SiCH$_2$Cl groups, with sulfuric acid to ≡SiCH$_2$OCH$_2$Si≡ groups or with hydroxides by cleavage of the Si—C bonds of the SiCH$_2$OH groups to give Si—OH groups), such that the product does not have the theoretically expected number and concentration of ≡SiCH$_2$OH groups. Moreover, reagent residues and/or catalyst residues in the product frequently lead to rearrangement, cleavage, condensation or equilibration of the siloxane skeleton, such that the product properties of (hydroxymethyl)polysiloxanes, which were prepared by the methods described to date, frequently change on storage. All this complicates or prevents the further processing of the (hydroxymethyl)polysiloxanes, prepared by the methods described to date, to defined conversion products and this applies especially to subsequent reactions of the SiCH$_2$OH group.

DE 102009046254 describes a method for reacting terminal OH-functional polysiloxanes with cyclic or acyclic alkoxysilanes to give terminal (hydroxymethyl)polysiloxanes. In this method, rearrangements of the skeleton do not occur and defined products are formed.

SUMMARY OF THE INVENTION

The object of the invention, therefore, is to improve on the prior art and to provide a method for preparing (hydroxymethyl)polysiloxanes having lateral hydroxymethyl groups, which affords defined products, preferably with high purity and preferably with high product stability.

Surprisingly, it has been found that lateral hydroxymethylpolysiloxanes are also accessible by the method described in DE 102009046254.

DETAILED DESCRIPTION OF THE PREFERRED EMBODIMENTS

The invention provides a method for preparing (hydroxymethyl)polysiloxanes having lateral hydroxymethyl groups of the general formula I

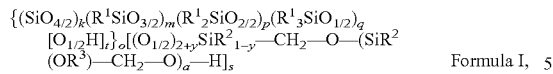  Formula I, which comprises reacting silanol-containing organosiloxanes of the general formula II

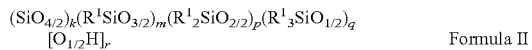  Formula II with cyclic or acyclic compounds having at least one unit of the general formula III $X-[SiR^2(OR^3)-CH_2-O]_n-Y$  Formula III where R$^1$ is a hydrogen atom or a cyclic or acyclic, linear or branched, aromatic or aliphatic or olefinic, saturated or unsaturated C$_1$-C$_{20}$ hydrocarbon residue or C$_1$-C$_{20}$ hydrocarbonoxy residue or C$_4$-C$_{40}$ polyether residue, each optionally substituted with Q$^1$, optionally interrupted by one or more groups Q$^2$ or comprising one or more groups Q$^2$, R$^2$ is a hydroxyl residue or a cyclic or acyclic, linear or branched, aromatic or aliphatic or olefinic, saturated or unsaturated C$_1$-C$_{20}$ hydrocarbon residue or C$_1$-C$_{20}$ hydrocarbonoxy residue or C$_4$-C$_{40}$ polyether residue or Si$_1$-Si$_{20}$ siloxanoxy residue, each optionally substituted with Q$^1$, optionally interrupted by one or more groups Q$^2$ or comprising one or more groups Q$^2$, R$^3$ is hydrogen or a cyclic or acyclic, linear or branched, aromatic or aliphatic or olefinic, saturated or unsaturated C$_1$-C$_{20}$ hydrocarbon residue or C$_4$-C$_{40}$ polyether residue or Si$_1$-Si$_{20}$ siloxanyl residue, each optionally substituted with Q$^1$, optionally interrupted by one or more groups Q$^2$ or comprising one or more groups Q$^2$, Q$^1$ is a heteroatom-containing monovalent residue, Q$^2$ is a heteroatom-containing divalent residue or a heteroatom-containing trivalent residue, X is a group R$^2$ or Q$^1$ or a hydrolyzable group including hydroxyl groups, alkoxy groups and acyloxy groups or is a bond together with Y (cyclic compound of the formula III) with the proviso that X, if n=1, is a hydrolyzable group or a siloxane residue which comprises at least one hydrolyzable group or is a bond together with Y (cyclic compound of the formula III), Y is a hydrogen atom, an acyl group, a silyl group, a siloxanyl group or is a bond together with X (cyclic compound of the formula III), k, m, p and q are greater than or equal to zero, with the proviso that the sum of k+m+p+q is greater than zero, o, s, r and n are greater than zero, a and t are greater than or equal to zero, and y is 0 or 1.

The variables k, m, p, q and t in compounds of the general formula I may have a different value in each of the o segments $\{(SiO_{4/2})_k(R^1SiO_{3/2})_m(R^1{}_2SiO_{2/2})_p(R^1{}_3SiO_{1/2})_q[O_{1/2}H]_t\}$.

The variables y and a in compounds of the general formula I may have a different value in each of the s segments $[(O_{1/2})_{2+y}SiR^2{}_{1-y}-CH_2-O-(SiR^2(OR^3)-CH_2-O)_a-H]$.

The units $(SiO_{4/2})$, $(R^1SiO_{3/2})$ and $(R^1{}_2SiO_{2/2})$ in formula I and formula II may also occur repeatedly, for example, as blocks, as individual units or as alternating units.

The units $[(O_{1/2})_{2+y}SiR^2{}_{1-y}-CH_2-O-(SiR^2(OR^3)-CH_2-O)_a-H]$, $(R^1{}_3SiO_{1/2})$ and $[O_{1/2}H]$ in formula I and the units $(R^1{}_3SiO_{1/2})$ and $[O_{1/2}H]$ in formula II may occur, for example, at multiple sites on the polymer backbone, regularly or randomly distributed for example.

The units $[SiR^2(OR^3)-CH_2-O]$ in formula III may also occur repeatedly, for example as blocks, as individual units or as alternating units, where R$^2$ and R$^3$ do not have the same meaning in all units.

Compounds having at least one unit of the general formula III are referred to below simply as "compounds of the formula III".

In the method according to the invention, the compounds of the formula II and of the formula III or mixtures comprising these compounds, may be prepared, mixed and added to one another in any sequence, optionally also repeatedly, optionally also alternately. In the method according to the invention at least one compound of the formula II and at least one compound of the formula III are used; two or more compounds of the formula II or of the formula III may also be used, simultaneously or sequentially, optionally also repeatedly, optionally also alternately. In the method according to the invention, at least one (hydroxymethyl)polysiloxane of the formula I is prepared; two or more compounds of the formula I may also be prepared in parallel. The compounds of the formula III may be free of solvolysates or may include their solvolysates, for example, with alcohols, water or silanols.

When compounds of the formula III are used for functionalizing Si—OH groups in organosiloxanes of the general formula II, these react surprisingly readily and specifically with silanol groups to form carbinols in good yields.

Alcohols $R^3OH$ or water and also, if appropriate, alcohols $R^2H$, are formed as by-products in the reaction from the $OR^3$ groups and, if appropriate, from the $R^2$ groups, if $R^2$ is a hydrolyzable group, which remain in the reaction mixture or may be removed therefrom, by distillation for example.

In the method according to the invention, intermediate compounds of the formula I having a certain value of a, which is greater than zero, may react with compounds of the formula II to give compounds of the formula I having a lower value of a, which can also be zero.

The method according to the invention differs in this way from the known methods to date for preparing lateral (hydroxymethyl)-polysiloxanes. In the methods known to date for preparing (hydroxymethyl)polysiloxanes, siloxanes are used or generated as precursors which bear a moiety of the structure siloxane-$CH_2$-A. Group A in this case is an acyloxy residue or a halogen atom and is converted to OH groups under harsh conditions such as with alkali metal hydroxides (A=halogen) or with alcohols under acid catalysis or with borohydrides (A=acyloxy). The harsh reaction conditions frequently result in rearrangements of the siloxane skeleton or in unwanted subsequent reactions on the (hydroxymethyl) groups produced, such as cleavage of Si—C bonds. Furthermore, siloxanes having a siloxane-$CH_2$-A (A=halogen or acyloxy) moiety are not standard products and have to be specifically generated as precursors. In contrast to this, it is possible to convert SiOH groups into lateral (hydroxymethyl) siloxane units surprisingly readily in the method according to the invention, such that, for example, the SiOH groups to be functionalized, which are to be converted to (hydroxymethyl) siloxane units, are themselves sufficiently reactive to generate the $CH_2OH$ groups as described, although promoters or catalysts may optionally be used. Moreover, the organopolysiloxanes of the formula II used in the method according to the invention are standard products of the silicon industry, and therefore do not need to be prepared separately as precursors for the synthesis of (hydroxymethyl)polysiloxanes.

The (hydroxymethyl)polysiloxanes having lateral hydroxymethyl groups generated in the method according to the invention may still contain silanol groups. These may be reacted with silylating agents, for example, according to a method described in DE 102009046254, in which low silanol-content or silanol-free (hydroxymethyl)polysiloxanes having lateral hydroxymethyl groups are formed. They may also be reacted, according to another method described in DE 102009046254, to give further terminal hydroxymethyl groups, such that low silanol-content or silanol-free (hydroxymethyl)polysiloxanes having lateral and terminal hydroxymethyl groups can be generated. This can also be done at the same time as, or before, carrying out the method according to the invention. For this purpose, the compounds of the formula III used may also contain $[SiR^2_2—CH_2—O]$ units, which result in terminal hydroxymethyl groups.

The invention further relates to (hydroxymethyl)polysiloxanes having lateral and terminal hydroxymethyl groups of the general formula Ia

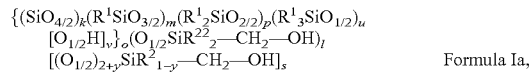

Formula Ia, where
$R^1, R^2, Q^1, Q^2, k, m, p, o, y$ and s may have the meanings and values as defined above,
$R^{22}$ is a cyclic or acyclic, linear or branched, aromatic or aliphatic or olefinic, saturated or unsaturated $C_1$-$C_{20}$ hydrocarbon residue or $C_1$-$C_{20}$ hydrocarbonoxy residue or $C_4$-$C_{40}$ polyether residue, each optionally substituted with $Q^1$, optionally interrupted by one or more groups $Q^2$ or comprising one or more groups $Q^2$,
l is greater than zero, and
u and v are greater than or equal to zero.

The variables k, m, p, u and v in compounds of the general formula Ia may have a different value in each of the o segments $\{(SiO_{4/2})_k(R^1SiO_{3/2})_m(R^1_2SiO_{2/2})_p(R^1_3SiO_{1/2})_u[O_{1/2}H]_v\}$. The variable y in compounds of the general formula Ia can have a different value in each of the s segments $[(O_{1/2})_{2+y}SiR^2_{1-y}—CH_2—OH]$.

Compounds of the formula Ia arise from compounds of the formula I, in which in at least some of the segments $(R^1_3SiO_{1/2})$ two $R^1$ residues are $R^{22}$ and one $R^1$ residue is hydroxymethyl, q has the value u and t has the value v and a is equal to zero.

$R^1, R^2, Q^1, Q^2, k, m, p, o, y$ and s in compounds of the formula Ia have the preferred, more preferred or particularly preferred meanings described as preferred, more preferred or particularly preferred in compounds of the formula I. $R^{22}$ has the preferred, more preferred or particularly preferred meanings described as preferred, more preferred or particularly preferred for $R^2$. u, v and l have the preferred, more preferred or particularly preferred meanings described as preferred, more preferred or particularly preferred for q, t and s respectively.

The method according to the invention offers the possibility to introduce lateral hydroxymethyl groups into polysiloxanes under mild conditions and thus without changes to the skeleton. Furthermore, it has the advantage that the degree of functionalization can be adjusted over a wide range in a freely selectable defined manner, such that, for example, the preparation of linear siloxanes having a certain ratio of $SiCH_2OH$ groups to $Si(CH_3)_2$ groups is possible. These precisely defined siloxanes are particularly well-suited to polyaddition reactions of the A-A+B-B type ("A"=$SiCH_2OH$, "B"=e.g. isocyanate).

$R^1, R^2$ and $R^3$ preferably have 1 to 12 carbon atoms, particularly 1 to 6 carbon atoms, preferably only carbon atoms and hydrogen atoms, or an alkoxy oxygen atom and otherwise only carbon atoms and hydrogen atoms.

$R^1$ and $R^2$ are preferably straight-chain or branched or cyclic $C_1$-$C_6$ hydrocarbon residues or $C_1$-$C_6$ hydrocarbonoxy residues. $R^3$ is preferably a straight-chain or branched or cyclic $C_1$-$C_6$ hydrocarbon residue. $R^1$ residues are preferably methyl, ethyl, phenyl, allyl and vinyl, particularly preferably methyl. $R^2$ residues are preferably methyl, ethyl, phenyl, allyl, vinyl, methoxy and ethoxy, particularly preferably methyl, methoxy and ethoxy. $R^3$ residues are preferably methyl, ethyl, n-propyl, isopropyl, n-butyl, sec-butyl, isobutyl, tert-butyl and phenyl, particularly preferably methyl and ethyl.

Preference is given to preparing compounds of the general formula I in which $R^1$ and $R^2$ are methyl, methoxy or ethoxy residues and $R^3$ are methyl or ethyl residues. Preference is given to using compounds of the general formula II in which $R^1$ are methyl residues. Preference is given to using compounds of the general formula III in which $R^2$ are methyl, methoxy or ethoxy residues and $R^3$ are methyl or ethyl residues.

$Q^1$ is preferably a fluorine, chlorine, bromine, iodine, cyanato, isocyanato, cyano, nitro, silyl, silylalkyl, silylaryl, siloxy, siloxanoxy, siloxyalkyl, siloxanoxyalkyl, siloxyaryl, siloxanoxyaryl, hydroxyl, alkoxy, aryloxy, acyloxy, amino, alkylamino, arylamino, dialkylamino, diarylamino, arylalkylamino, acylamino, imido, imino, mercapto, alkylthio or arylthio substituents, O-alkyl-N-carbamato, O-aryl-N-carbamato, N-alkyl-O-carbamato, N-aryl-O-carbamato, hydroxycarbonyl, alkoxycarbonyl, aryloxycarbonyl or cyclic or acyclic carbonato, alkylcarbonato or arylcarbonato substituents.

$Q^2$ is preferably a heteroatom-containing divalent residue, such as —O—, —S—, —N($R^4$)—, —C(O)—, epoxy, —C(O)—O—, —O—C(O)—O—, —O—C(O)—N($R^4$)—, —C(O)—N($R^4$)—, —N[C(O)$R^4$]—, silandiyl, siloxandiyl or siloxanoxydiyl, where $R^4$ is hydrogen or optionally substituted $C_1$-$C_{20}$-alkyl or $C_6$-$C_{20}$-aryl residues, or is a heteroatom-containing trivalent residue, such as —N= oder —P=.

The (hydroxymethyl)polysiloxane of the general formula I may be, for example, linear, cyclic or branched. It may be present in a monomodal, bimodal or multimodal molar mass distribution and at the same time the molar mass distribution can be narrow or very broad.

In (hydroxymethyl)polysiloxanes of the general formula I, the ratio of s to the sum of k, m, p and q (in all o segments) is preferably in the range from 1:10,000 to 10,000:1, preferably in the range from 1:1000 to 1000:1, particularly preferably in the range from 1:100 to 100:1. The ratio of t (in all o segments) to s is in this case preferably in the range from 0 to 10,000:1, preferably in the range from 0 to 1000:1, particularly preferably in the range from 0 to 100:1, while t may particularly be equal to zero. The variable s is preferably a number from 1 to 100,000, preferably 1 to 10,000, particularly preferably 1 to 1000.

The variables a and y in formula I preferably have the value 0. The [$O_{1/2}$H] groups and the [($O_{1/2}$)$_{2+y}$Si$R^2_{1-y}$—$CH_2$—O— (Si$R^2$(O$R^3$)—$CH_2$—O)$_a$—H] groups are preferably bonded to ($R^1_2$Si$O_{2/2}$) groups.

The hydroxy-functional organosiloxane of the general formula II may be, for example, linear, cyclic or branched. It may be present in a monomodal, bimodal or multimodal molar mass distribution and at the same time the molar mass distribution can be narrow or very broad.

In hydroxy-functional organosiloxanes of the general formula II, the ratio of r to the sum of k, m, p and q is preferably in the range from 1:10,000 to 10,000:1, preferably in the range from 1:1000 to 1000:1, particularly preferably in the range from 1:100 to 100:1. The [$O_{1/2}$H] groups are preferably bonded to ($R^1_2$Si$O_{2/2}$) groups.

A preferred variant of an organosiloxane of the general formula II is a linear silicon polymer with k and m equal to 0, p greater than or equal to 1, q equal to 0 or 1 and r equal to 1 or 2, with the condition that r+q is equal to 2, particularly preferably with q equal to 0, p greater than or equal to 2 and r equal to 2. p is preferably equal to 3 to 10,000, preferably 4 to 1000, particularly preferably 5 to 200. The nominated values for p refer to the average chain lengths (number average) of the siloxanes. In this case, the preferred organosiloxanes of the general formula II may have a monomodal, bimodal or multimodal distribution, and may at the same time have a narrow or very broad molar mass distribution.

A further preferred variant of a branched organosiloxane of the general formula II used is an organosilicon resin. This may consist of a plurality of units, as shown in the general formula II, where the mole percent of units present are designated by the indices k, m, p, q, r, s and t. A value of 0.1 to 20 mol % of units r is preferred, based on the sum of k, m, p, q and r. At the same time k+m must be >0.

In this connection, resins are preferably prepared in which k+m is: 5 mol %, preferably 10 mol %<k+m<90 mol %, preferably 80 mol %, based on the sum of k, m, p, q, s and t. In a particularly preferred case, the residues $R^1$ are methyl residues.

A preferred method for preparing (hydroxymethyl)polysiloxanes is characterized in that the silicon-containing organosiloxanes of the formula II used are compounds of the formula IIa below

HO(Si$R^{11}_2$O)H     Formula IIa, where α is an integer from 2 to 20,000 and $R^{11}$ is methyl, ethyl, vinyl, allyl or phenyl. α preferably has values of 3 to 10,000, preferably 4 to 1000, particularly preferably 5 to 200.

The nominated values for α refer to the average chain lengths (number average) of the siloxanes.

$R^{11}$ is preferably methyl, ethyl, vinyl or phenyl, preferably methyl or vinyl, particularly preferably methyl.

Formula IIa arises from formula II, when in formula II the residues $R^1$ are $R^{11}$ and k, m and q all have the value 0 and r has a value of 2 and p the value α, where α may have the values as defined above.

In formula III the variable n preferably has values greater than or equal to 1, preferably values of 1 to 100, particularly preferably 1 to 30, particularly 1 to 10. The variable n may have values of, for example, 1, 2, 3, 4, 5, 6, 7, 8, 9, 10 or 11-30 or greater. X together with Y is preferably a bond. In this case cylic compounds of the formula III result, which consist exclusively of [Si$R^2$(O$R^3$)—$CH_2$—O], units. The compounds of the formula III may contain further [Si$R^2$(O$R^3$)—$CH_2$—O] units in the residues $R^2$ or $R^3$.

A preferred method for preparing (hydroxymethyl)polysiloxanes is characterized in that the compounds of the formula III used are compounds of the formula IIIa below

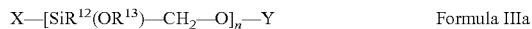

X—[Si$R^{12}$(O$R^{13}$)—$CH_2$—O]$_n$—Y     Formula IIIa where $R^{12}$ may be methyl, ethyl, vinyl, allyl, phenyl, methoxy, ethoxy, n-propoxy, isopropoxy, n-butoxy, isobutoxy, sec-butoxy or tert-butoxy and $R^{13}$ may be methyl, ethyl, n-propyl, isopropyl, n-butyl, isobutyl, sec-butyl or tert-butyl, and n, X and Y may have the same meanings as defined above.

$R^{12}$ is preferably methyl, ethyl, vinyl, allyl, phenyl, methoxy or ethoxy, preferably methyl, ethyl, vinyl, phenyl, methoxy or ethoxy, particularly preferably methyl or methoxy.

$R^{13}$ is preferably methyl or ethyl, particularly preferably methyl.

n, X and Y in formula IIIa have the preferred, more preferred or particularly preferred meanings defined as preferred, more preferred or particularly preferred for formula III.

Formula IIIa arises from formula III, when in formula III the residues $R^2$ are $R^{12}$ and the residues $R^3$ are $R^{13}$, where n, X and Y may have the same values as defined for formula III.

The compounds having one unit of the general formula III used are compounds of the general formulae IV or V below

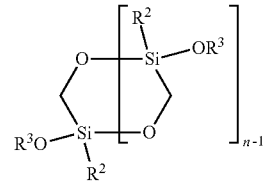

Formula IV

Formula V

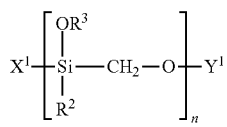

where

R² and R³ in formulae IV and V may have the same meanings as defined above and have the preferred, more preferred or particularly preferred meanings defined above as preferred, more preferred or particularly preferred for R² and R³, or where in preferred embodiments R² is R¹² and R³ is R¹³, with the preferred, more preferred or particularly preferred meanings defined above for R¹² and R¹³, n may have the same meanings as defined above and is preferably 1-100, preferably 1-30 and particularly preferably 1-10, X¹ is a hydrolyzable group including hydroxyl groups, alkoxy groups and acyloxy groups, preferably a hydroxyl group, a $C_1$-$C_{20}$ alkoxy group, a $C_6$-$C_{20}$ aryloxy group or a $C_4$-$C_{40}$ polyether group, particularly an hydroxyl group, a methoxy group or an ethoxy group, and Y¹ is a hydrogen atom, an acyl group, a silyl group or a siloxanyl group, preferably a hydrogen atom.

n may have values of, for example, 1, 2, 3, 4, 5, 6, 7, 8, 9, 10 or greater.

One preferred method is characterized in that at least one of the compounds of the formula III used is selected from compounds of the formula IIIb below Formula IIIb

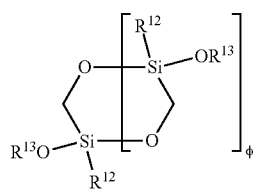

where R¹² and R¹³ may have the same meanings as defined above and where R¹² and R¹³ in formula IIIb have preferred, more preferred or particularly preferred meanings defined above as preferred, more preferred or particularly preferred for R¹² and R¹³, and where φ may have integer values greater than or equal to 1 and preferably has values of 1 to 10, preferably the values 1 or 2, particularly preferably 1.

The compounds particularly preferably used having at least one unit of the general formula III are the specific compounds numbered 1 to 14 below,

1

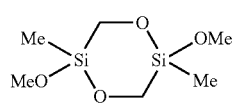

2

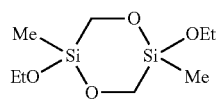

3

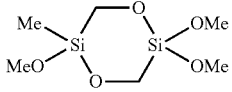

4

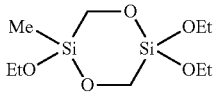

5

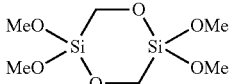

6

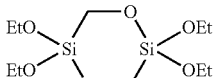

7

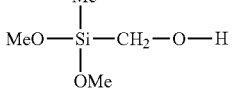

8

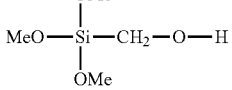

9

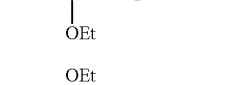

10

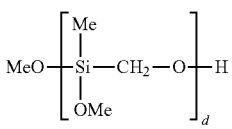

11

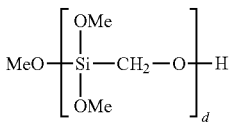

12

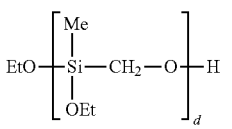

13

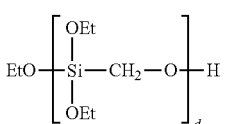

14

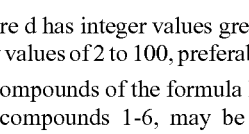

where d has integer values greater than or equal to 2, preferably values of 2 to 100, preferably 2 to 30, particularly 2 to 10.

Compounds of the formula III, IIIa, IIIb, IV or V and also the compounds 1-6, may be prepared by metal-catalysed transesterification with elimination of a low molecular weight ester from suitable (acyloxymethyl)alkoxysilanes (DE 102010003108). The compounds 7-14 may be obtained as further described below.

A preferred method for preparing (hydroxymethyl)polysiloxanes as product of the formula I is characterized in that compounds of the formula Ib below are prepared

$HO\{(SiR^{11}_2O)_\alpha[SiR^{12}—CH_2—OH]\}_\beta(SiR^{11}_2O)_\alpha H$   Formula Ib, where $\alpha$ is an integer from 2 to 20,000 and $\beta$ is an integer from 1 to 10,000 and $R^{11}$ and $R^{12}$ have the meanings defined above, wherein compounds of the formula IIa are reacted with compounds of the formula IIIa.

$\alpha$ preferably has values of 3 to 10,000, preferably 4 to 1000, particularly preferably 5 to 200. The nominated values for $\alpha$ refer to the average chain lengths (number average) of the siloxanes. $\beta$ preferably has values of 1 to 1000, preferably 1 to 100, particularly preferably 1 to 20.

The quantitative ratio of compounds of the formula II, which were selected from the possibilities defined for formula IIa, to compounds of the formula III, which were selected from the possibilities defined for formula IIIa, is preferably selected such that the quantitative ratio of the silanol groups in formula IIa, less the two residual terminal silanol groups in the compounds of the formula Ib, to the quantitative ratio of the $[SiR^{12}(OR^{13})—CH_2—O]$ units in formula IIIa, based on the number n of occurrences thereof in formula IIIa, is preferably 1.6 to 2.4, preferably 1.8 to 2.2, particularly preferably 2.0. "Less the two residual terminal silanol groups in the compounds of the formula Ib" means, for $\beta=1$ for example, that two molecules of the formula IIa, corresponding to four silanol groups, less two residual silanol groups in the product of the formula Ib equals two reactive silanol groups, are reacted with one $[SiR^{12}(OR^{13})—CH_2—O]$ unit. For $\beta=4$, for example, this means that five molecules of the formula IIa, corresponding to ten silanol groups, less two residual silanol groups in the product of the formula Ib equals eight reactive silanol groups, are reacted with four $[SiR^{12}(OR^{13})—CH_2—O]$ units. "Based on the number n of occurrences thereof in formula IIIa" means, for n=2 for example, the unit $[SiR^{12}(OR^{13})—CH_2—O]_n$ is calculated as two $[SiR^{12}(OR^{13})—CH_2—O]$ units, for n=3 for example, as three $[SiR^{12}(OR^{13})—CH_2—O]$ units, and so on.

If compounds of the formula II are reacted with compounds of the formula III in a different quantitative ratio to that required for compounds of the formula I, then deficient components may subsequently be added at a later time point in any sequence, optionally in multiple portions, until the desired quantitative ratio is reached. This procedure has also been described in detail in DE 102009046254 as an example of terminal (hydroxymethyl)polysiloxanes.

Furthermore, excess $(SiR^2(OR^3)—CH_2—O)$ units in the $[(O_{1/2})_{2+y} SiR^2_{1-y}—CH_2—O—(SiR^2(OR^3)—CH_2—O)_n—H]$ segments of the compounds of the formula I may be cleaved by solvolysis with protic reagents, water or alcohols for example, and optionally subsequently removed. This procedure has been likewise described in detail in DE 102009046254 as an example of terminal (hydroxymethyl) polysiloxanes.

$[(O_{1/2})_{2+y}SiR^2_{1-y}—CH_2—O—(SiR^2(OR^3)—CH_2—O)_a—H]$ segments may also occur during the course of the reaction of the preparation process, if an excess of compounds of the formula III is not used, based on the quantitative ratio of the structural elements $[SiR^2(OR^3)—CH_2—O]$ in compounds of the formula III to silanol groups in compounds of the formula II.

The abovementioned method may be carried out preferably at temperatures of 0° C. to 250° C. However, reaction temperatures of at least 0° C. to 150° C. are preferably used, particularly from 0° C. to 120° C. The method may be carried out uncatalyzed. The method can be improved by adding catalysts. These catalysts are acidic or basic compounds or metal compounds and this means that both reaction times and reaction temperatures may be reduced.

In this case, the catalyst used is preferably an inorganic or organic Lewis acid or Lewis base, or inorganic or organic Brønstedt acid or Brønstedt base, an organometallic compound or a halide salt.

The acids preferably used are carboxylic acids, partially esterified carboxylic acids, particularly monocarboxylic acids, preferably formic acid or acetic acid, non-esterified or partially esterified mono-, oligo- or polyphosphoric acids, non-hydrolyzed or partially hydrolyzed phosphonitrile chloride, sulfonic acids, alkyl hydrogen sulfates or acidic ion exchangers. Preferred bases include alkylammonium hydroxides, ammonium alkoxides, alkylammonium fluorides or amine bases, guanidine bases or amidine bases. Preferred metal compounds are tin compounds, zinc compounds, aluminum compounds, bismuth compounds or titanium compounds. Preferred organometallic compounds are organotin compounds, organozinc compounds, organoaluminum compounds, organobismuth compounds or organotitanium compounds. Preferred salts are tetraalkylammonium fluorides.

The catalysts used are deactivated after the functionalization reaction of the silanol groups, preferably by addition of so-called anticatalysts or catalyst poisons, which are removed by distillation, decanting, centrifugation or filtration, or adsorbed on a support material, precipitated, complexed or extracted, before they can cause a cleavage of the Si—O—Si groups. This side reaction is dependent on the catalyst used and does not necessarily occur such that, if appropriate, a deactivation or removal of the catalyst may also be obviated. Examples of catalyst poisons are e.g. acids when using bases and e.g. bases when using acids, which in the end leads to a simple neutralization reaction. The corresponding reaction product of the catalyst and catalyst poison may, depending on the use of the product, either be removed from the product or remain in the product. Examples of catalysts which may be removed by distillation are carboxylic acids, for example, formic acid or acetic acid, or amine bases, amidine bases or guanidine base, such as triethylamine, tributylamine, ethyldiisopropylamine, ethylenediamine, tetramethylguanidine, 1,8-diazabicyclo[5.4.0]undec-7-ene, 1,5-diazabicyclo[4.3.0]non-5-ene or 1,4-diazabicyclo[2.2.2]octane. Examples of catalysts which may be removed by decanting, filtration or by centrifugation are heterogeneous catalysts such as polymer-supported acids or bases, acidic or basic ion exchangers, or acidic or basic aluminum oxide. Examples of catalysts which may be adsorbed, complexed or precipitated are tin compounds, zinc compounds or titanium compounds. Preference is given to using catalysts which can be removed from the product by distillation, particularly preferably nitrogen bases which can be removed distillatively. The catalysts which can be removed by distillation are characterized in that, as measured by the catalyst as pure substance, they have a vapour pressure of at least 1 hPa, preferably at least 10 hPa, preferably at least 100 hPa, particularly preferably at least 1000 hPa at temperatures of up to at most 300° C., preferably at most 250° C., preferably at most 210° C., particularly preferably at most 180° C.

In the method for preparing (hydroxymethyl)polysiloxanes of the general formula I, the amount of compound used having units of the general formula III is dependent on the amount r of the silanol groups to be functionalized in the organosiloxane of the general formula II. If a complete functionalization of the OH groups is desired to be achieved, then the compound having units of the general formula III is added in at least equivalent amounts, based on n. If the compound having units of the general formula III is used in excess, then the reacted compound subsequently may be distilled off, or be solvolyzed, preferably hydrolyzed, optionally after thermolytic cleavage, and then also optionally be distilled off, or unreacted excess compound of the formula III may be removed, for example, by the methods mentioned. For example, compounds of the formula I with a>0 may occur as intermediates, from which the excess reacted equivalents of compounds of the formula III can be cleaved by thermolysis or solvolysis, such that compounds of the formula I with a=0 may be obtained.

Furthermore, the organopolysiloxanes of the formula II used in the method according to the invention may contain water, which may react in hydrolysis reactions with the compounds of the formula III or with the compounds of the formula I with a>0 which occur optionally as intermediates during the conduction of the method. This results in a corresponding additional consumption of compound of the formula III. This can be allowed for by using correspondingly greater amounts of compound of the general formula III, in which, if $R^2$ is a non-hydrolyzable group, one mole units of the formula III, based on n, or, if $R^2$ is a hydrolyzable group, 2/3 mole units of the formula III, based on n, are preferably additionally added per mole of water. Methods for water determination are generally known, such as Karl-Fischer titration or headspace GC. Compounds of the formula III may occur, for example, as hydrolysis products, which may further react in the method according to the invention. After carrying out the method according to the invention, the hydrolysis products can optionally remain in the product or be removed by distillative methods for example, or by applying a vacuum, preferably with heating. Alternatively, before carrying out the method according to the invention, the water may be removed by suitable methods from the organopolysiloxanes of the formula II to be used, for example, by distillation, applying a vacuum, heating, reacting with water-trapping reagents, adsorption on water-absorbing media such as molecular sieves or aluminum oxide, drying with salts such as magnesium sulfate, sodium sulfate, calcium chloride or potassium carbonate, or by combining drying methods, for example, by combining the methods mentioned, for example combining heating and applying a vacuum, which is possible, for example, on a thin-film evaporator or short-path evaporator. Preference is given to removing the water prior to carrying out the method according to the invention. The drying is in this case preferably effected until a residual water content of less than 10,000 ppm, preferably less than 1000 ppm, particularly preferably less than 500 ppm, is attained.

The methods may be carried out either including solvents or also without using solvents in suitable reactors. In this case, the method is carried out optionally under reduced pressure or elevated pressure or at atmospheric pressure (0.1 MPa absolute). The methods may be carried out continuously or as a batch process.

The solvents used can be, for example, cyclic or acyclic hydrocarbons, ethers, esters, alcohols, amides, urea derivatives or halogenated organic compounds or solvent mixtures. Preference is given to using inert solvents, particularly aprotic solvents, for example aliphatic hydrocarbons such as heptane, and aromatic hydrocarbons such as toluene. Ethers such as tetrahydrofuran, diethyl ether or methyl tert-butyl ether may also be used. The amount of solvent should be sufficient in order to ensure an adequate homogenization of the reaction mixture. Preference is given to solvents or solvent mixtures having a boiling point or boiling point range of up to 120° C. at 0.1 MPa absolute.

If protic solvents are used, particularly alcohols, these can convert different compounds of the formula III into one another. Thus, cyclic compounds of the formula III, for example, may be reacted to give acyclic compounds of the formula III, whereby Y is converted to hydrogen and optionally n is decreased, optionally as far as n=1. Furthermore, acyclic compounds of the formula III may be converted to other acyclic compounds of the formula III having a lower value of n, optionally down to n=1. Moreover, in compounds of the formula III, solvolyzable $OR^3$ groups, and optionally $R^2$, X and Y may be cleaved by protic solvents or be exchanged with other groups. The novel compounds of the formula III, such as the compounds 7-14, obtained by the effect of protic solvents, particularly alcohols, on compounds of the formula III, may also be used in the method according to the invention.

The preparation of compounds 8, 10, 12 and 14 by acid-catalyzed alcoholysis of suitable acyloxymethylsilanes is described in DE 4407437. The method has several disadvantages: Elevated temperatures and long reaction times are required. The reaction may be incomplete. An acidic catalyst is necessary, which either remains in the product and, as elucidated above, may lead to troublesome side or subsequent reactions on the hydroxymethyl group, or has to be neutralized and removed in a complex additional method step. If the catalyst remains in the product, this can give rise to a reduced product quality and durability.

The invention therefore further provides a method for preparing compounds of the formula III, which comprises reacting cyclic compounds of the formula IIIc

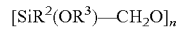  Formula IIIc with compounds $R^5OH$ to give acyclic compounds of the formula IIId

  Formula IIId where
$R^2$, $R^3$ and n may have the meanings and values further described above, and
$R^5$ is hydrogen or a cyclic or acyclic, linear or branched, aromatic or aliphatic or olefinic, saturated or unsaturated $C_1-C_{20}$ hydrocarbon residue, $C_4-C_{40}$ polyether residue or $C_1-C_{20}$ acyl residue, each optionally substituted with $Q^1$, optionally interrupted by one or more groups $Q^2$ or comprising one or more groups $Q^2$,
$Q^1$ is a heteroatom-containing monovalent residue,
$Q^2$ is a heteroatom-containing divalent residue or a heteroatom-containing trivalent residue, and
b is greater than zero.

In the method according to the invention, the compounds of the formula IIIc and the compounds $R^5OH$ or mixtures comprising these compounds, may be prepared, mixed and added to one another in any sequence, optionally also repeatedly, optionally also alternately. In the method according to the invention at least one compound of the formula IIIc and at least one compound $R^5OH$ is used; two or more compounds of the formula IIIc or $R^5OH$ may also be used, simultaneously or sequentially, optionally also repeatedly, optionally also alternately. In the method according to the invention, at least one acyclic compound of the formula IIId is prepared; two or more compounds of the formula IIId may also be prepared in parallel.

If compounds of the formula IIIc are reacted with compounds $R^5OH$, these react readily and specifically in good yields to compounds of the formula IIId. The magnitude of the variables b in this case is governed by the quantitative ratio of OH groups in $R^5OH$ to $[SiR^2(OR^3)$—$CH_2$—$O]$ units in IIIc. The greater this ratio is, the smaller is b, down to b=1.

In the reaction, $OR^3$ groups and optionally $R^2$ may be exchanged with $OR^5$ groups, both in the compounds of the formula IIIc and in the compounds of the formula IIId. In this case, alcohols $R^3OH$ and, if appropriate, $R^2H$, if $R^2$ is an alkoxy group, are formed as byproducts.

The method according to the invention differs in this way from the method described in DE 4407437 for preparing (hydroxymethyl)trialkoxysilanes. Elevated temperatures, long reaction times or acidic catalysts are not necessary. The product forms readily and rapidly in high yield and purity. The method according to the invention therefore provides the possibility to prepare compounds of the formula IIId, the compounds 7-14 for example, under mild conditions. These compounds may be used not only for functionalizing siloxanes, but also for functionalizing particles or surfaces.

The residues $R^2$, $R^3$, $Q^2$ and $Q^2$ and also the variable n in the formulae IIIc, IIId and $R^5OH$ have the preferred, more preferred or particularly preferred meanings defined further as preferred, more preferred or particularly preferred in formula III above.

The residue $R^5$ in the compound $R^5OH$ preferably has 1 to 12 carbon atoms, particularly 1 to 8 carbon atoms, preferably only carbon atoms and hydrogen atoms, or a carbonyl oxygen atom and otherwise only carbon atoms and hydrogen atoms. $R^5$ is preferably a straight-chain or branched or cyclic $C_1$-$C_8$ hydrocarbon residue. Preferred residues for $R^5$ are methyl, ethyl, n-propyl, isopropyl, allyl, n-butyl, sec-butyl, isobutyl, tert-butyl, n-pentyl, 2-pentyl, 3-pentyl, 2-methyl-1-butyl, 3-methyl-1-butyl, 3-methyl-2-butyl, neopentyl, tert-pentyl, cyclopentyl, n-hexyl, cyclohexyl, n-octyl, benzyl, phenyl, 2-methylphenyl, 3-methylphenyl and 4-methylphenyl, particularly preferred are methyl and ethyl.

Particular preference is given to preparing compounds of the formula IIId in which $R^2$ are methyl, methoxy or ethoxy residues and $R^3$ and $R^5$ are methyl or ethyl residues.

The variable b preferably has values greater than or equal to 1, preferably values of 1 to 100, particularly preferably 1 to 30, particularly 1 to 10. The variable b may have values of, for example, 1, 2, 3, 4, 5, 6, 7, 8, 9, 10 or 11-30 or greater.

Compounds of the formula IIIc are preferably the compounds 1-6. Compounds $R^5OH$ are preferably methanol and ethanol. Compounds of the formula IIId are preferably the compounds 7-14, in which the variable d has the meanings described above. The nominated values for d refer to the average chain lengths (number average) of the compounds 11-14. In this case, these may have a monomodal, bimodal or multimodal distribution, and may at the same time have a narrow or very broad molar mass distribution.

The units $[SiR^2(OR^3)$—$CH_2$—$O]$ in the formulae IIIc and IIId may also occur repeatedly, for example as blocks, as individual units or as alternating units, where $R^2$ and $R^3$ do not have the same meaning in all units.

If compounds of the formula IIIc are reacted with compounds $R^5OH$ in a different quantitative ratio to that required for the desired compounds of the formula IIId, then deficient components may subsequently be added at a later time point in any sequence, optionally in multiple portions, until the desired quantitative ratio is reached.

Compounds of the formula IIId with b>1 may also occur transiently or stably during the course of the method according to the invention, if sufficient OH groups are present in compound $R^5OH$ used, in order to react compounds of the formula IIIc completely to compounds of the formula IIId with b=1.

The abovementioned method may be carried out preferably at temperatures of 0° C. to 250° C. Preference is given to using reaction temperatures of at least 0° C. to 150° C., particularly from 0° C. to 120° C. The method is preferably carried out uncatalyzed. However, acidic or basic compounds or metal compounds may also be used as catalysts.

The catalyst preferably used in this case is an inorganic or organic Brønstedt acid or Brønstedt base or an inorganic or organic Lewis acid or Lewis base.

Examples of Brønstedt acids are carboxylic acids, partially esterified carboxylic acids, particularly monocarboxylic acids, preferably formic acid or acetic acid, non-esterified or partially esterified mono-, oligo- or polyphosphoric acids, sulfonic acids, alkyl hydrogen sulfates or acidic ion exchangers. Examples of Lewis acids are iron compounds, tin compounds, zinc compounds, aluminum compounds, bismuth compounds or titanium compounds. Examples of bases are alkylammonium hydroxides, ammonium alkoxides, alkylammonium fluorides or amine bases, guanidine bases or amidine bases.

The catalysts used are deactivated after the reaction, preferably by addition of anticatalysts or catalyst poisons, which are removed by distillation, decanting, centrifugation or filtration, or adsorbed on a support material, precipitated, complexed or extracted, before they can cause side reactions. These side reactions are dependent on the catalyst used and do not necessarily occur such that, if appropriate, a deactivation or removal of the catalyst may also be obviated. Examples of catalyst poisons are e.g. acids when using bases and e.g. bases when using acids, which in the end leads to a simple neutralization reaction. The corresponding reaction product of the catalyst and catalyst poison may, depending on the use of the product, either be removed from the product or remain in the product. Examples of catalysts which may be removed by distillation are carboxylic acids, for example, formic acid or acetic acid, or amine bases, amidine bases or guanidine base, such as triethylamine, tributylamine, ethyldiisopropylamine, ethylenediamine, tetramethylguanidine, 1,8-diazabicyclo [5.4.0]undec-7-ene, 1,5-diazabicyclo[4.3.0]non-5-ene or 1,4-diazabicyclo[2.2.2]octane. Examples of catalysts which may be removed by decanting, filtration or by centrifugation are heterogeneous catalysts such as polymer-supported acids or bases, acidic or basic ion exchangers, or acidic or basic aluminum oxide. Examples of catalysts which may be adsorbed, complexed or precipitated are tin compounds, zinc compounds or titanium compounds. Preference is given to using catalysts which can be removed by decanting, centrifugation or filtration without deactivation or following deactivation.

The $R^5OH$ compounds used in the method according to the invention may contain water, which can react in hydrolysis reactions with the compounds of the formula IIIc or IIId during or after carrying out the method. This results in a corresponding additional consumption of compound of the formula IIIc. This can be allowed for by using correspondingly greater amounts of compound of the formula general IIIc, in which, if $R^2$ is a non-hydrolyzable group, one mole units of the formula IIIc, based on n, or, if $R^2$ is a hydrolyzable group, 2/3 mole units of the formula III, based on n, are preferably additionally added per mole of water. Methods for water determination are generally known, such as Karl-Fischer titration or headspace GC. Compounds of the formula IIIc may occur, for example, as hydrolysis products, which may further react in the method according to the invention. After carrying out the method according to the invention, the hydrolysis products can optionally remain in the product or be removed by suitable methods. Alternatively, the water may be removed from the $R^5OH$ compound to be used by suitable methods as further described above before carrying out the method according to the invention. Preference is given to removing the water prior to carrying out the method according to the invention. The drying is in this case preferably effected until a residual water content of less than 10 000 ppm, preferably less than 1000 ppm, particularly preferably less than 500 ppm, is attained.

The method may be carried out either including solvents or without using solvents. Preference is given to using an excess of $R^5OH$ compound as solvent without any additional solvent. In this case, the method is carried out optionally under reduced pressure or elevated pressure or at atmospheric pressure (0.1 MPa absolute). The method may be carried out continuously or as a batch process.

The solvents used can be, for example, cyclic or acyclic hydrocarbons, ethers, esters, ketones, nitriles, amides, urea derivatives or halogenated organic compounds or solvent mixtures. Preference is given to using inert solvents, particularly aprotic solvents such as aliphatic hydrocarbons, e.g. heptane, aromatic hydrocarbons, e.g. toluene, or ethers, e.g. tetrahydrofuran, diethyl ether or methyl tert-butyl ether. The amount of solvent should be sufficient in order to ensure an adequate homogenization of the reaction mixture.

The (hydroxymethyl)polysiloxanes or (hydroxymethyl) polysiloxane resins prepared according to one of the above-mentioned methods may be used for reaction with isocyanates, for preparing urethanes, polyurethanes or polyurethane copolymers, for reaction with carboxylic acids or carboxylic acid derivatives, or for preparing esters, polyesters or polyester copolymers.

The meanings of all aforementioned symbols of the aforementioned formulae are each mutually independent, unless explicitly stated otherwise.

In the examples below, all pressures are 0.10 MPa (abs.) and all temperatures are 20° C., unless stated otherwise. All viscosities were determined at 25° C.

Example 1

Preparation of a Compound of the General Formula I a) Compound of the Formula Ib with $\alpha=11.8$ and $\beta=1$ 133.6 g of α,ω-bis(hydroxy)-terminated polydimethylsiloxane having an average chain length of 11.8 $Me_2SiO$ units (determined by $^1$H-NMR spectroscopy, corresponding to an average molar mass of 893.0 g/mol, corresponding to 149.6 mmol of polydimethylsiloxane having 299.2 mmol of SiOH groups, viscosity 32.6 mPas, 90 ppm water) were stirred at 20° C. with 34 mg (0.3 mmol) of tetramethylguanidine (catalyst, 0.2 mol % based on polydimethylsiloxane) and 7.8 g (37.4 mmol) of a mixture of 2,5-dimethoxy-2,5-dimethyl-1,4-dioxa-2,5-disilacyclohexane (1) and higher oligomers thereof. After 7 days the $^1$H-NMR spectrum showed complete conversion. The MeOH formed during the reaction was then removed at room temperature under reduced pressure. The compound of the formula Ia remained as a colorless oil. The gel permeation chromatogram (PDMS calibration) showed approximately a doubling of the molar mass, compared to the OH-terminated polydimethylsiloxane used. Compounds of the formula Ia were detectable by MALDI-TOF MS.

Viscosity: 51.4 mPas $^1$H-NMR: −0.2 . . . 0.2 ppm (129.0; H, $SiCH_3$), 2.43 ppm (broad, 3H, OH), 3.14 ppm (2H, $SiCH_2O$)

~>average chain length: 22.0=2×10.5+1 b) Compound of the Formula Ia with k, m, u, v, y=0; p=11.8; o, l=2; s=1; $R^1=R^2=R^{22}$=Me (Non-Inventive)

The compound of the formula Ia prepared in example Ia was stirred at room temperature with 13.2 g (74.8 mmol) of 2,2,5,5-tetramethyl-1,4-dioxa-2,5-disilacyclohexane. After 2 days the $^1$H-NMR spectrum showed complete conversion. The catalyst and volatile substances were subsequently removed under reduced pressure at 50° C. 139 g (68.3 mmol, 91%) of compound of the formula Ib remained as a colorless oil. The gel permeation chromatogram (PDMS calibration) showed approximately a doubling of the molar mass, compared to the OH-terminated polydimethylsiloxane used.

Viscosity: 51.9 mPas $^1$H-NMR: −0.2 . . . 0.2 ppm (135.5; H, $SiCH_3$), 1.11 ppm (broad, 3H, OH), 3.14 ppm (2H, $SiCH_2O$ lateral), 3.21 ppm (4H, $SiCH_2O$ terminal)

~>average chain length: 23.1=2×10.1+3

Example 2

Preparation of a Compound of the General Formula I a) Compound of the Formula Ib with $\alpha=11.8$ and $\beta=4$ 133.6 g of α,ω-bis(hydroxy)-terminated polydimethylsiloxane having an average chain length of 11.8 $Me_2SiO$ units (determined by $^1$H-NMR spectroscopy, corresponding to an average molar mass of 893.0 g/mol, corresponding to 149.6 mmol of polydimethylsiloxane having 299.2 mmol of SiOH groups, viscosity 32.6 mPas, 90 ppm water) were stirred at 20° C. with 17 mg (0.15 mmol) of tetramethylguanidine (catalyst, 0.1 mol % based on polydimethylsiloxane) and 12.5 g (60.0 mmol) of a mixture of 2,5-dimethoxy-2,5-dimethyl-1,4-dioxa-2,5-disilacyclohexane (1) and higher oligomers thereof. After 5 days the $^1$H-NMR spectrum showed complete conversion. The MeOH formed during the reaction was then removed at room temperature under reduced pressure. 134.7 g (28.3 mmol, 94%) of the compound of the formula Ia remained as a colorless oil. The gel permeation chromatogram (PDMS calibration) showed approximately a five-fold increase of the molar mass, compared to the OH-terminated polydimethylsiloxane used.

Viscosity: 99.5 mPas $^1$H-NMR: −0.2 . . . 0.2 ppm (367.2; H, $SiCH_3$), 0.5 . . . 2.5 ppm (very broad, 6H, OH), 3.14 ppm (8H, $SiCH_2O$)

~>average chain length: 63.2=5×11.8+4 b) Compound of the Formula Ia with k, m, u, v, y=0; p=11.8; o=5; l=2; s=4; $R^1=R^2=R^{22}$=Me (Non-Inventive)

The compound of the formula Ia prepared in example 2a was stirred at room temperature with a further 17 mg (0.15 mmol) of tetramethylguanidine (catalyst, 0.1 mol % based on polydimethylsiloxane) and 6.8 g (38.6 mmol, excess) of a mixture of 2,2,5,5-tetramethyl-1,4-dioxa-2,5-disilacyclohexane and higher oligomers thereof. After 16 days the $^1$H-NMR spectrum showed complete conversion. The catalyst and volatile substances were subsequently removed under reduced pressure at 50° C. 132 g (26.8 mmol, 94% based on the compound of the formula Ia used, 89% overall) of compound of the formula Ib remained as a colorless oil. The gel permeation chromatogram (PDMS calibration) showed approximately a five-fold increase of the molar mass, compared to the OH-terminated polydimethylsiloxane used.

Viscosity: 107.5 mPas $^1$H-NMR: −0.2 . . . 0.2 ppm (392.6; H, $SiCH_3$), 1.09 ppm (broad, 6H, OH), 3.14 ppm (8H, $SiCH_2O$ lateral), 3.21 ppm (4H, $SiCH_2O$ terminal)

~>average chain length: 67.4=5×12.3+6

Example 3

Preparation of a Compound of the General Formula I a) Compound of the Formula Ib with α=30.6 and β=1

141.6 g of α,ω-bis(hydroxy)-terminated polydimethylsiloxane having an average chain length of 30.6 Me$_2$SiO units (determined by $^1$H-NMR spectroscopy, corresponding to an average molar mass of 2287.2 g/mol, corresponding to 61.9 mmol of polydimethylsiloxane having 123.8 mmol of SiOH groups, viscosity 75.2 mPas, 865 ppm water) were stirred at 20° C. with 35 mg (0.3 mmol) of tetramethylguanidine (catalyst, 0.5 mol % based on polydimethylsiloxane) and 3.6 g (17.3 mmol, excess due to water content of the polydimethylsiloxane) of a mixture of 2,5-dimethoxy-2,5-dimethyl-1,4-dioxa-2,5-disilacyclohexane (1) and higher oligomers thereof. After 2 days the $^1$H-NMR spectrum showed complete conversion. The MeOH formed during the reaction was then removed at room temperature under reduced pressure. The compound of the formula Ia remained as a colorless oil. The gel permeation chromatogram (PDMS calibration) showed a doubling of the molar mass, compared to the OH-terminated polydimethylsiloxane used. Compounds of the formula Ia were detectable by MALDI-TOF MS.

Viscosity: 156 mPas $^1$H-NMR: −0.2 . . . 0.2 ppm (316.4; H, SiCH$_3$), 1.47 ppm (broad, 3H, OH), 3.14 ppm (2H, SiCH$_2$O)

~>average chain length: 53.2=2×26.1+1 b) Compound of the Formula Ia with k, m, u, v, y=0; p=30.6; o, l=2; s=1; R$^1$=R$^2$=R$^{22}$=Me (Non-Inventive)

The compound of the formula Ia prepared in example 3a was stirred at room temperature with 5.2 g (29.4 mmol) of a mixture of 2,2,5,5-tetramethyl-1,4-dioxa-2,5-disilacyclohexane and higher oligomers thereof. After 19 days the $^1$H-NMR spectrum showed complete conversion. The catalyst and other volatile substances were subsequently removed at 50° C./0.04 mbar. 120.8 g (25.0 mmol, 81%) of compound of the formula Ib were obtained as a colorless oil. The gel permeation chromatogram (PDMS calibration) showed a doubling of the molar mass, compared to the OH-terminated polydimethylsiloxane used.

Viscosity: 142.6 mPas $^1$H-NMR: −0.2 . . . 0.2 ppm (399.1; H, SiCH$_3$), 1.07 ppm (broad, 2H, OH terminal), 1.55 ppm (broad, 1H, OH lateral), 3.14 ppm (2H, SiCH$_2$O lateral), 3.21 ppm (4H, SiCH$_2$O terminal)

~>average chain length: 67.0=2×32.0+3

Example 4

Preparation of a Compound of the General Formula I a) Compound of the Formula Ib with α=30.6 and β=1

324.4 g of α,ω-bis(hydroxy)-terminated polydimethylsiloxane having an average chain length of 30.6 Me$_2$SiO units (determined by $^1$H-NMR spectroscopy, corresponding to an average molar mass of 2287.2 g/mol, corresponding to 141.8 mmol of polydimethylsiloxane having 243.6 mmol of SiOH groups, viscosity 75.2 mPas, 865 ppm water) were stirred at 20° C. with 0.8 g (6.9 mmol) of tetramethylguanidine (catalyst, 4.9 mol % based on polydimethylsiloxane) and 8.39 g (40.3 mmol, excess due to water content of the polydimethylsiloxane) of 2,5-dimethoxy-2,5-dimethyl-1,4-dioxa-2,5-disilacyclohexane (1). After 1 day the $^1$H-NMR spectrum showed complete conversion. The MeOH formed during the reaction was then removed at room temperature under reduced pressure. The compound of the formula Ia remained as a colorless oil.

$^1$H-NMR: −0.2 . . . 0.2 ppm (307.8; H, SiCH$_3$), 2.0 ppm (very broad, 3H, OH), 3.14 ppm (2H, SiCH$_2$O)

~>average chain length: 51.8=2×25.4+1 b) Compound of the Formula Ia with k, m, u, v, y=0; p=30.6; o, l=2; s=1; R$^1$=R$^2$=R$^{22}$=Me (Non-Inventive)

The compound of the formula Ia prepared in example 4a was stirred at room temperature with 12.3 g (69.7 mmol) of a mixture of 2,2,5,5-tetramethyl-1,4-dioxa-2,5-disilacyclohexane and higher oligomers thereof. After 18 days the $^1$H-NMR spectrum showed complete conversion. The catalyst and other volatile substances were subsequently removed by thin film distillation at 120° C./1-2 mbar. 337 g (69.9 mmol, 99%) of compound of the formula Ib were obtained as a colorless oil. The gel permeation chromatogram (PDMS calibration) showed a doubling of the molar mass, compared to the OH-terminated polydimethylsiloxane used.

Viscosity: 152.1 mPas $^1$H-NMR: −0.2 . . . 0.2 ppm (371.7; H, SiCH$_3$), 1.03 ppm (broad, 2H, OH terminal), 1.49 ppm (broad, 1H, OH lateral), 3.14 ppm (2H, SiCH$_2$O lateral), 3.22 ppm (4H, SiCH$_2$O terminal)

~>average chain length: 62.5=2×29.7+3

Example 5

Preparation of a Compound of the General Formula I a) Compound of the Formula Ib with α=30.6 and β=1

324.4 g of α,ω-bis(hydroxy)-terminated polydimethylsiloxane having an average chain length of 30.6 Me$_2$SiO units (determined by $^1$H-NMR spectroscopy, corresponding to an average molar mass of 2287.2 g/mol, corresponding to 141.8 mmol of polydimethylsiloxane having 243.6 mmol of SiOH groups, viscosity 75.2 mPas, 865 ppm water) were stirred at 20° C. with 0.8 g (6.9 mmol) of tetramethylguanidine (catalyst, 4.9 mol % based on polydimethylsiloxane) and 8.75 g (42.0 mmol, excess due to water content of the polydimethylsiloxane) of 2,5-dimethoxy-2,5-dimethyl-1,4-dioxa-2,5-disilacyclohexane (1). After 1 day the $^1$H-NMR spectrum showed complete conversion. The MeOH formed during the reaction was then removed at room temperature under reduced pressure. The compound of the formula Ia remained as a colorless oil. The gel permeation chromatogram (PDMS calibration) showed a doubling of the molar mass, compared to the OH-terminated polydimethylsiloxane used.

$^1$H-NMR: −0.2 . . . 0.2 ppm (283.1; H, SiCH$_3$), 1.6 ppm (very broad, 3H, OH), 3.14 ppm (2H, SiCH$_2$O)

~>average chain length: 47.7=2×23.3+1 b) Compound of the Formula Ia with k, m, u, v, y=0; p=30.6; o, l=2; s=1; R$^1$=R$^2$=R$^{22}$=Me (Non-Inventive)

The compound of the formula Ia prepared in example 5a was stirred at room temperature with 12.3 g (69.7 mmol) of a mixture of 2,2,5,5-tetramethyl-1,4-dioxa-2,5-disilacyclohexane and higher oligomers thereof. After 7 days the $^1$H-NMR spectrum showed complete conversion. The catalyst and other volatile substances were subsequently removed by thin film distillation at 120° C./1-2 mbar. 289.5 g (60.0 mmol, 85%) of compound of the formula Ib were obtained as a colorless oil. The gel permeation chromatogram (PDMS calibration) showed a doubling of the molar mass, compared to the OH-terminated polydimethylsiloxane used. Compounds of the formula Ib were detectable by MALDI-TOF MS.

Viscosity: 137.5 mPas $^1$H-NMR: −0.2 . . . 0.2 ppm (332.8; H, SiCH$_3$), 1.03 ppm (broad, 2H, OH terminal), 1.52 ppm (broad, 1H, OH lateral), 3.14 ppm (2H, SiCH$_2$O lateral), 3.21 ppm (4H, SiCH$_2$O terminal)

~>average chain length: 56.0=2×26.5+3

Example 6

Preparation of a Compound of the General Formula I a) Compound of the Formula Ib with α=45.8 and β=1

240.0 g of α,ω-bis(hydroxy)-terminated polydimethylsiloxane having an average chain length of 45.8 Me$_2$SiO units (determined by $^1$H-NMR spectroscopy, corresponding to an average molar mass of 3414.3 g/mol, corresponding to 70.3 mmol of polydimethylsiloxane having 140.6 mmol of SiOH groups, viscosity 83.7 mPas, 500 ppm water) were stirred at 20° C. with 40 mg (0.35 mmol) of tetramethylguanidine (catalyst, 0.5 mol % based on polydimethylsiloxane) and 3.6 g (17.3 mmol) of 2,5-dimethoxy-2,5-dimethyl-1,4-dioxa-2,5-disilacyclohexane (1). After 1 day the $^1$H-NMR spectrum showed complete conversion. The MeOH formed during the reaction was then removed at room temperature under reduced pressure. The compound of the formula Ia remained as a colorless oil.

$^1$H-NMR: −0.2 . . . 0.2 ppm (581.3; H, SiCH$_3$), 1.45 ppm (broad, 1H, SiCOH), 2.20 ppm (broad, 2H, SiOH), 3.13 ppm (2H, SiCH$_2$O)

~>average chain length: 97.4=2×48.2+1 b) Compound of the Formula Ia with k, m, u, v, y=0; p=45.8; o, l=2; s=1; R$^1$=R$^2$=R$^{22}$=Me (Non-Inventive)

The compound of the formula Ia prepared in example 6a was stirred at room temperature with 9.3 g (52.7 mmol, excess) of a mixture of 2,2,5,5-tetramethyl-1,4-dioxa-2,5-disilacyclohexane and higher oligomers thereof. After 5 days the $^1$H-NMR spectrum showed complete conversion. The catalyst, excess 2,2,5,5-tetramethyl-1,4-dioxa-2,5-disilacyclohexane and other volatile substances were subsequently removed by thin film distillation at 120° C./1-2 mbar. 241.6 g (34.1 mmol, 97%) of compound of the formula Ib were obtained as a colorless oil. The gel permeation chromatogram (PDMS calibration) showed a doubling of the molar mass, compared to the OH-terminated polydimethylsiloxane used. Compounds of the formula Ib were detectable by MALDI-TOF MS.

Viscosity: 174.8 mPas $^1$H-NMR: −0.2 . . . 0.2 ppm (608.1; H, SiCH$_3$), 0.98 ppm (broad, 2H, OH terminal), 1.03 ppm (broad, 1H, OH lateral), 3.13 ppm (d, $^3$J$_{HH}$=5.0 Hz, 2H, SiCH$_2$O lateral), 3.21 ppm (d, $^3$J$_{HH}$=4.5 Hz, 4H, SiCH$_2$O terminal)

~>average chain length: 101.4=2×49.2+3

Example 7

Preparation of a Compound of the General Formula I a) Compound of the Formula I with k, m, q, a=0; p=13.0; o=3; s, t, y=1; R$^1$=Me 99.4 g of α,ω-bis(hydroxy)-terminated polydimethylsiloxane having an average chain length of 13.0 Me$_2$SiO units (determined by $^1$H-NMR spectroscopy, corresponding to an average molar mass of 982.0 g/mol, corresponding to 101.3 mmol of polydimethylsiloxane having 202.6 mmol of SiOH groups, viscosity 32.6 mPas, 90 ppm water) were stirred at 20° C. with 17 mg (0.15 mmol) of tetramethylguanidine (catalyst, 0.15 mol % based on polydimethylsiloxane) and 4.18 g (17.4 mmol) of a mixture of 2,2,5,5-tetramethoxy-1,4-dioxa-2,5-disilacyclohexane (5) and higher oligomers thereof. After 1 day the $^1$H-NMR spectrum showed complete conversion. The MeOH formed during the reaction was then removed at room temperature under reduced pressure. The compound of the formula I remained as a colorless oil and was identified by MALDI-TOF MS.

Viscosity: 88.3 mPas $^1$H-NMR: −0.2 . . . 0.2 ppm (190.1; H, SiCH$_3$), 1 . . . 3 ppm (very broad, 4H, OH), 3.17 ppm (2H, SiCH$_2$O)

~>average chain length: 32.7=3×10.6+1 b) Compound of the Formula Ia with k, m, u, v=0; p=13.0; o, l=3; s, y=1; R$^1$=R$^{22}$=Me (Non-Inventive)

The compound of the formula I prepared in example 7a was stirred at room temperature with 8.87 g (50.3 mmol) of a mixture of 2,2,5,5-tetramethyl-1,4-dioxa-2,5-disilacyclohexane and higher oligomers thereof. After 7 days the $^1$H-NMR spectrum showed complete conversion. The catalyst and other volatile substances were subsequently removed under reduced pressure at 50° C./0.6 mbar. 81.9 g (25.1 mmol, 74%) of compound of the formula Ib were obtained as a colorless oil and identified by MALDI-TOF MS.

Viscosity: 80.2 mPas $^1$H-NMR: −0.2 . . . 0.2 ppm (194.6; H, SiCH$_3$), 1.00 ppm (broad, 1H, OH lateral), 1.48 ppm (broad, 3H, OH terminal), 3.15 ppm (d, $^3$J$_{HH}$=5.1 Hz, 2H, SiCH$_2$O lateral), 3.20 ppm (6H, SiCH$_2$O terminal)

~>average chain length: 33.4=3×9.8+3

Example 8

Preparation of a Compound of the General Formula I a) Compound of the Formula I with k, m, q, a=0; p=24.5; o=3; S, T, Y=1; R$^1$=Me 86.3 g of α,ω-bis(hydroxy)-terminated polydimethylsiloxane having an average chain length of 24.5 Me$_2$SiO units (determined by $^1$H-NMR spectroscopy, corresponding to an average molar mass of 1834.8 g/mol, corresponding to 47.0 mmol of polydimethylsiloxane having 94.0 mmol of SiOH groups, 1500 ppm water) were stirred at 20° C. with 1.4 mg (0.012 mmol) of tetramethylguanidine (catalyst, 260 mol ppm based on polydimethylsiloxane) and 1.9 g (7.9 mmol) of a mixture of 2,2,5,5-tetramethoxy-1,4-dioxa-2,5-disilacyclohexane (5) and higher oligomers thereof. After 1 day the $^1$H-NMR spectrum showed complete conversion. The MeOH formed during the reaction was then removed at room temperature under reduced pressure. The compound of the formula I remained as a colorless oil. The gel permeation chromatogram (PDMS calibration) showed a tripling of the molar mass, compared to the OH-terminated polydimethylsiloxane used. Compounds of the formula I were detectable by MALDI-TOF MS.

Viscosity: 163.7 mPas $^1$H-NMR: −0.2 . . . 0.2 ppm (384.9; H, SiCH$_3$), 1.47 ppm (broad, 4H, OH), 3.19 ppm (2H, SiCH$_2$O)

~>average chain length: 65.1=3×21.4+1 b) Compound of the Formula Ia with k, m, u, v=0; p=24.5; o, l=3; s, y=1; R$^1$=R$^{22}$=Me (Non-Inventive)

The compound of the formula I prepared in example 8a was stirred at room temperature with 4.6 g (26.1 mmol, excess) of a mixture of 2,2,5,5-tetramethyl-1,4-dioxa-2,5-disilacyclohexane and higher oligomers thereof. After 22 days the $^1$H-NMR spectrum showed complete conversion. The catalyst and other volatile substances were subsequently removed under reduced pressure at 50° C./0.5 mbar. 80.9 g (13.9 mmol, 89%) of compound of the formula Ib were obtained as a colorless oil and identified by MALDI-TOF MS.

Viscosity: 121.7 mPas $^1$H-NMR: −0.2 . . . 0.2 ppm (365.7; H, SiCH$_3$), 1.01 ppm (broad, 3H, OH terminal), 1.49 ppm (broad, 1H, OH lateral), 3.17 ppm (d, $^3J_{HH}$=5.3 Hz, 2H, SiCH$_2$O lateral), 3.22 ppm (6H, SiCH$_2$O terminal)
~>average chain length: 62.0=3×19.3+3

Example 9

Preparation of a Compound of the General Formula I a) Compound of the Formula I with k, m, q, a=0; p=45.8; o=3; s, t, y=1; R$^1$=Me 247 g of α,ω-bis(hydroxy)-terminated polydimethylsiloxane having an average chain length of 45.8 Me$_2$SiO units (determined by $^1$H-NMR spectroscopy, corresponding to an average molar mass of 3414.3 g/mol, corresponding to 72.3 mmol of polydimethylsiloxane having 144.6 mmol of SiOH groups, viscosity 83.7 mPas, 500 ppm water) were stirred at 20° C. with 40 mg (0.35 mmol) of tetramethylguanidine (catalyst, 0.48 mol % based on polydimethylsiloxane) and 2.9 g (12.1 mmol) of a mixture of 2,2,5,5-tetramethoxy-1,4-dioxa-2,5-disilacyclohexane (5) and higher oligomers thereof. After 2 days the $^1$H-NMR spectrum showed complete conversion. The MeOH formed during the reaction was then removed at room temperature under reduced pressure. The compound of the formula I remained as a colorless oil.

$^1$H-NMR: −0.2 . . . 0.2 ppm (718.8; H, SiCH$_3$), 1 . . . 2.5 ppm (very broad, 4H, OH), 3.17 ppm (2H, SiCH$_2$O)
~>average chain length: 120.8=3×39.9+1 b) Compound of the Formula Ia with k, m, u, v=0; p=45.8; o, l=3; s, y=1; R$^1$=R$^{22}$=Me (Non-Inventive)

The compound of the formula I prepared in example 9a was stirred at room temperature with 9.4 g (53.3 mmol, excess) of a mixture of 2,2,5,5-tetramethyl-1,4-dioxa-2,5-disilacyclohexane and higher oligomers thereof. After 5 days the $^1$H-NMR spectrum showed complete conversion. The catalyst and other volatile substances were subsequently removed by thin film distillation at 120° C./1-2 mbar. 246.5 g (23.3 mmol, 97%) of compound of the formula Ib were obtained as a colorless oil.

Viscosity: 373.3 mPas $^1$H-NMR: −0.2 . . . 0.2 ppm (624.4; H, SiCH$_3$), 0.97 ppm (t, $^3J_{HH}$=4.6 Hz, 3H, OH terminal), 1.46 ppm (broad, 1H, OH lateral), 3.15 ppm (d, $^3J_{HH}$=5.5 Hz, 2H, SiCH$_2$O lateral), 3.20 ppm (d, $^3J_{HH}$=4.7 Hz, 6H, SiCH$_2$O terminal)
~>average chain length: 105.1=3×34.7+3

Example 10

Preparation of Compounds of the General Formula IIId

Compound 7

2.1 g (10 mmol) of 2,5-dimethoxy-2,5-dimethyl-1,4-dioxa-2,5-disilacyclohexane (1) were dissolved in 16.2 ml (12.8 g, 400 mmol) of methanol (99.8%) and were stirred at room temperature. After 1 day, compound 7 (85 area % by GC based on the total content of silicon compounds, 71% intensity in the $^{29}$Si-NMR) and compound 11 with d=2 were detected in the reaction mixture by means of NMR, GC and GC-MS.

Compound 7:
$^1$H-NMR: 0.05 ppm (SiCH$_3$), 3.22 ppm (SiCH$_2$OH), 3.41 ppm (SiOCH$_3$)
$^{13}$C-NMR: −7.6 ppm (SiCH$_3$), 50.8 ppm (SiCH$_2$OH), 50.1 ppm (SiOCH$_3$)
$^{29}$Si-NMR: −8.6 ppm
MS (M=136 g/mol): 121, 105 (base peak), 91, 75, 59, 45 m/z

Example 11

Preparation of Compounds of the General Formula IIId

Compound 8

2.4 g (10 mmol) of a mixture of 2,2,5,5-tetramethoxy-1,4-dioxa-2,5-disilacyclohexane (5) and higher oligomers thereof were dissolved in 16.2 ml (12.8 g, 400 mmol) of methanol (99.8%) and were stirred at room temperature. After 1 day, compound 8 (79.4 area % by GC based on the total content of silicon compounds, 77% intensity in the $^{29}$Si-NMR) and compound 12 with d=2 were detected in the reaction mixture by means of NMR, GC and GC-MS.

Compound 8:
$^1$H-NMR: 3.20 ppm (SiCH$_2$OH), 3.40 ppm (SiOCH$_3$)
$^{13}$C-NMR: 47.5 ppm (SiCH$_2$OH), 50.2 ppm (SiOCH$_3$)
$^{29}$Si-NMR: −51.1 ppm
MS (M=152 g/mol): 152 (molecular peak), 151, 137, 121 (base peak), 107, 91, 77, 61, 59, 45 m/z

Example 12

Preparation of Compounds of the General Formula IIId

Compound 9

2.1 g (10 mmol) of a mixture of 2,5-dimethoxy-2,5-dimethyl-1,4-dioxa-2,5-disilacyclohexane (1) and higher oligomers thereof were dissolved in 35.1 ml (27.7 g, 600 mmol) of ethanol (99.8%) and were stirred at room temperature. After 5 days, compound 9 (77 area % by GC based on the total content of silicon compounds, 49% intensity in the $^{29}$Si-NMR), hydroxymethyl(ethoxy)methoxymethylsilane (11% intensity in the $^{29}$Si-NMR), compound 2,2-ethoxy-5-methoxy-2,5-dimethyl-1,4-dioxa-2,5-disilacyclohexane and compound 13 with d=2 were detected in the reaction mixture by means of NMR, GC and GC-MS.

Compound 9:
$^1$H-NMR: 0.06 ppm (SiCH$_3$), 1.08 ppm (CH$_3$), 3.20 ppm (SiCH$_2$OH), 3.68 ppm (SiOCH$_2$)
$^{13}$C-NMR: −6.5 ppm (SiCH$_3$), 17.9 ppm (CH$_3$), 51.5 ppm (SiCH$_2$OH), 58.3 ppm (SiOCH$_2$)
$^{29}$Si-NMR: −11.9 ppm
MS (M=164 g/mol): 149, 133, 121, 105, 91, 89, 77 (base peak), 63, 61, 45 m/z

Example 13

Preparation of Compounds of the General Formula IIId

Compound 10

2.4 g (10 mmol) of a mixture of 2,2,5,5-tetramethoxy-1,4-dioxa-2,5-disilacyclohexane (5) and higher oligomers thereof were dissolved in 23.4 ml (18.4 g, 400 mmol) of ethanol (99.8%) and were stirred at room temperature. After 1 day, compound 10 (64.4 area % by GC based on the total content of silicon compounds, 42% intensity in the $^{29}$Si-NMR), hydroxymethyl(diethoxy)methoxysilane (18.4 area % by GC, 19% intensity in the $^{29}$Si-NMR), hydroxymethyl(ethoxy)dimethoxysilane (1.6 area % by GC, 4% intensity in the $^{29}$Si-NMR), compound 6 (6.3 area % by GC), 2,2,5-triethoxy-5-methoxy-1,4-dioxa-2,5-disilacyclohexane (2.1 area % by GC) and compound 14 with d=2 were detected in the reaction mixture by means of NMR, GC and GC-MS.

Compound 10:

$^1$H-NMR: 1.12 ppm (CH$_3$), 3.77 ppm (SiOCH$_2$), (SiCH$_2$OH hidden)

$^{13}$C-NMR: 17.8 ppm (CH$_3$), 49.5 ppm (SiCH$_2$OH), 58.6 ppm (SiOCH$_2$)

$^{29}$Si-NMR: −54.0 ppm

MS (M=194 g/mol): 193, 179, 165, 163, 151, 137, 135, 121, 119, 107, 93, 91, 79 (base peak), 77, 63, 45 m/z

The invention claimed is:

1. A method for preparing (hydroxymethyl)polysiloxanes having lateral hydroxymethyl groups of the formula Ib $$\text{HO}\{(\text{SiR}^{11}{}_2\text{O})_\alpha[\text{SiR}^{12}\text{—CH}_2\text{—OH}]\}_\beta(\text{SiR}^{11}{}_2\text{O})_\alpha\text{H} \quad \text{(Ib)}$$

comprising reacting silanol-containing organosiloxanes of the formula IIa, $$\text{HO}(\text{SiR}^{11}{}_2\text{O})_\alpha\text{H} \quad \text{(IIa)}$$

with compounds of the formula IIIa $$\text{X—[SiR}^{12}(\text{OR}^{13})\text{—CH}_2\text{—O]}_n\text{—Y} \quad \text{(IIIa)}$$

where
- n is greater than zero,
- α is an integer from 2 to 20,000,
- β is an integer from 1 to 10,000,
- R$^{11}$ is methyl, ethyl, vinyl, allyl or phenyl,
- R$^{12}$ is methyl, ethyl, vinyl, allyl, phenyl, methoxy, ethoxy, n-propoxy, isopropoxy, n-butoxy, isobutoxy, sec-butoxy or tert-butoxy,
- R$^{13}$ is methyl, ethyl, n-propyl, isopropyl, n-butyl, isobutyl, sec-butyl or tert-butyl,
- X is a group R$^2$ or Q$^1$ or a hydroxyl, alkoxy, or acyloxy hydrolysable group or is a bond together with Y, with the proviso that X, if n=1, is a hydrolyzable group or a siloxane residue which comprises at least one hydrolyzable group or is a bond together with Y,
- Y is hydrogen, an acyl group, a silyl group, a siloxanyl group, or is a bond together with X,
- R$^2$ is hydroxyl, or a cyclic or acyclic, linear or branched, aromatic or aliphatic or olefinic, saturated or unsaturated C$_1$-C$_{20}$ hydrocarbon residue, a C$_1$-C$_{20}$ hydrocarbonoxy residue, a C$_4$-C$_{40}$ polyether residue, or a Si$_i$—Si$_{20}$ siloxanoxy residue, each optionally substituted with Q$^1$, optionally interrupted by one or more groups Q$^2$ or comprising one or more groups Q$^2$,
- Q$^1$ is a heteroatom-containing monovalent residue,
- Q$^2$ is a heteroatom-containing divalent residue or a heteroatom-containing trivalent residue, wherein the quantitative ratio of compounds of the formula IIa to compounds of the formula IIIa is selected such that the quantitative ratio of silanol groups in formula IIa less the two residual terminal silanol groups in the compounds of the formula Ib, to the quantitative ratio of the [SiR$^{12}$(OR$^{13}$)—CH$_2$—O] units in formula IIIa, based on the number n of occurrences thereof in formula IIIa, is 1.6 to 2.4.

* * * * *